(12) United States Patent
Liu et al.

(10) Patent No.: US 10,032,457 B1
(45) Date of Patent: Jul. 24, 2018

(54) CIRCUIT AND METHOD FOR COMPENSATING FOR LOST FRAMES

(71) Applicant: Beken Corporation, Shanghai (CN)

(72) Inventors: Lianxue Liu, Shanghai (CN); Weifeng Wang, Shanghai (CN)

(73) Assignee: BEKEN CORPORATION, Shanghai (CN)

( * ) Notice: Subject to any disclaimer, the term of this patent is extended or adjusted under 35 U.S.C. 154(b) by 0 days.

(21) Appl. No.: 15/616,920

(22) Filed: Jun. 8, 2017

(30) Foreign Application Priority Data

May 16, 2017 (CN) .......................... 2017 1 0345216

(51) Int. Cl.
| | |
|---|---|
| *G10L 19/005* | (2013.01) |
| *G10L 25/06* | (2013.01) |
| *G06F 11/14* | (2006.01) |
| *G10L 19/16* | (2013.01) |

(52) U.S. Cl.
CPC .......... *G10L 19/005* (2013.01); *G10L 19/167* (2013.01); *G06F 11/1492* (2013.01); *G10L 25/06* (2013.01)

(58) Field of Classification Search
CPC ..... G10L 19/005; G10L 25/06; G06F 11/1492
USPC .................. 704/E19.003, 223, 228; 714/747
See application file for complete search history.

(56) References Cited

U.S. PATENT DOCUMENTS

| | | | | |
|---|---|---|---|---|
| 7,324,444 B1 * | 1/2008 | Liang | ..................... | H04J 3/0632 |
| | | | | 370/230 |
| 9,330,672 B2 * | 5/2016 | Guan | ....................... | G10L 19/02 |
| 2003/0078769 A1 * | 4/2003 | Chen | ..................... | G10L 19/005 |
| | | | | 704/211 |
| 2003/0093746 A1 * | 5/2003 | Kang | ..................... | G10L 19/005 |
| | | | | 714/774 |
| 2005/0091048 A1 * | 4/2005 | Thyssen | ................ | G10L 19/005 |
| | | | | 704/223 |
| 2008/0240108 A1 * | 10/2008 | Hyldgaard | ............ | G10L 19/005 |
| | | | | 370/394 |
| 2009/0006084 A1 * | 1/2009 | Chen | ..................... | G10L 19/005 |
| | | | | 704/211 |

(Continued)

OTHER PUBLICATIONS

Liang, Yi J., et al. "Adaptive playout scheduling and loss concealment for voice communication over IP networks." IEEE Transactions on Multimedia 5.4, Dec. 2003, pp. 532-543.*

(Continued)

*Primary Examiner* — James Wozniak
(74) *Attorney, Agent, or Firm* — Perkins Coie LLP

(57) ABSTRACT

A circuit to compensate for a lost audio frame, comprising: an identifier configured to identify a reference audio segment with a first length followed by the lost audio frame with a second length; a searcher coupled to the identifier and configured to search for a first audio segment similar to the reference audio segment in a cached audio segment followed by the reference audio segment by utilizing a cross-correlation search; the identifier further configured to identify a second audio segment subsequent to the first audio segment as a pre-compensated audio frame; an adjustor coupled to the identifier and configured to adjust an amplitude of the second audio segment based on a scale factor; and an output coupled to the adjustor to output the adjusted second audio segment as a compensated audio frame.

8 Claims, 7 Drawing Sheets

(56) References Cited

U.S. PATENT DOCUMENTS

| | | | | |
|---|---|---|---|---|
| 2010/0161086 A1* | 6/2010 | Andersen | ............ | G10L 19/005 |
| | | | | 700/94 |
| 2010/0251051 A1* | 9/2010 | Sun | ............ | G10L 19/005 |
| | | | | 714/747 |
| 2013/0262122 A1* | 10/2013 | Kim | ............ | G10L 19/02 |
| | | | | 704/268 |
| 2014/0337039 A1* | 11/2014 | Guan | ............ | G10L 19/005 |
| | | | | 704/500 |
| 2015/0371647 A1* | 12/2015 | Faure | ............ | G10L 19/02 |
| | | | | 704/203 |
| 2016/0118055 A1* | 4/2016 | Wang | ............ | G10L 19/005 |
| | | | | 704/205 |
| 2016/0247506 A1* | 8/2016 | Lecomte | ............ | G10L 19/02 |
| 2016/0284356 A1* | 9/2016 | Bruhn | ............ | G10L 19/028 |
| 2017/0256266 A1* | 9/2017 | Sung | ............ | G10L 19/005 |

OTHER PUBLICATIONS

Ryu, Sang-Uk, et al. "Encoder assisted frame loss concealment for MPEG-AAC decoder." Acoustics, Speech and Signal Processing, 2006. ICASSP 2006 Proceedings. 2006 IEEE International Conference on. vol. 5. IEEE, May 2006, pp. 1-4.*

* cited by examiner

US 10,032,457 B1

CIRCUIT AND METHOD FOR COMPENSATING FOR LOST FRAMES

CROSS REFERENCE TO RELATED APPLICATION

This application claims priority to Chinese application No. 201710345216.5 entitled "Circuit and method for compensating for lost audio frames," filed on May 16, 2017 by Beken Corporation, which is incorporated herein by reference.

TECHNICAL FIELD

The present invention relates to audio frames, and more particularly, but not limited to a circuit and method for compensating for lost audio frames.

BACKGROUND

In Bluetooth standard protocol, Synchronous Connection Oriented (SCO)/Extended Synchronous Connection Oriented (eSCO) connection can be used to achieve real-time voice communication. Continuous Variable Slope Delta Modulation (CVSD) or A-Law/Mu Law voice coding used by air interface can achieve toll quality with a Mean Opinion Score (MOS) about 4.0. However, in the complex electromagnetic environment where 2.4 GHz band WIFI is widely used, even if there is a retransmission mechanism of eSCO, loss of audio frames is inevitable. Once there is a lost audio frame, a "pop" sound will be generated during a call, annoying the caller. Therefore, it may be desirable to provide a circuit and method to handle the above problem and eliminate the "pop" sound so as to enhance sound quality.

SUMMARY

An embodiment of the invention discloses a circuit to compensate for a lost audio frame, comprising: an identifier configured to identify a reference audio segment with a first length followed by the lost audio frame with a second length; a searcher coupled to the identifier and configured to search for a first audio segment similar to the reference audio segment in a cached audio segment followed by the reference audio segment by utilizing a cross-correlation search, wherein the length of the cached audio segment is larger than a total length of the first length and the second length, and the first audio segment has the same length as the reference audio segment; the identifier further configured to identify a second audio segment subsequent to the first audio segment as a pre-compensated audio frame, wherein the second audio segment has the same length as the lost audio frame; an adjustor coupled to the identifier and configured to adjust an amplitude of the second audio segment based on a scale factor; and an output coupled to the adjustor to output the adjusted second audio segment as a compensated audio frame.

Another embodiment of the invention discloses a method for compensating for a lost audio frame, comprising: identifying a reference audio segment with a first length followed by the lost audio frame with a second length; searching for a first audio segment similar to the reference audio segment in a cached audio segment followed by the reference audio segment by utilizing a cross-correlation search, wherein the length of the cached audio segment is larger than a total length of the first length and the second length, and the first audio segment has the same length as the reference audio segment; identifying a second audio segment subsequent to the first audio segment as a pre-compensated audio frame, wherein the second audio segment has the same length as the lost audio frame; adjusting an amplitude of the second audio segment based on a scale factor; and outputting the adjusted second audio segment as a compensated audio frame.

DESCRIPTION OF THE DRAWINGS

The present invention is illustrated in an exemplary manner by the accompanying drawings. The drawings should be understood as exemplary rather than limiting, as the scope of the invention is defined by the claims. In the drawings, the identical reference signs represent the same elements.

DETAILED DESCRIPTION

Various aspects and examples of the invention will now be described. The following description provides specific details for a thorough understanding and enabling description of these examples. Those skilled in the art will understand, however, that the invention may be practiced without many of these details. Additionally, some well-known structures or functions may not be shown or described in detail, so as to avoid unnecessarily obscuring the relevant description.

Figure 1:
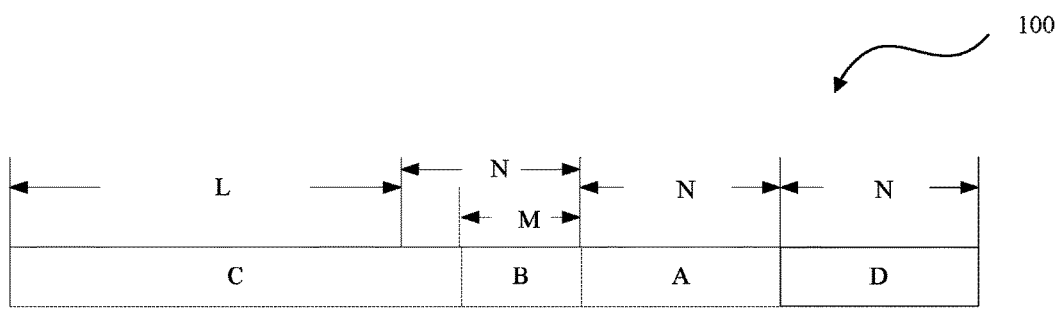
FIG. 1 is a diagram illustrating audio segments including a lost segment A with a length of N according to an embodiment of the invention.

FIG. 1 is a diagram illustrating audio segments 100 including a lost segment A with a length of N according to an embodiment of the invention. As shown in FIG. 1, the audio segments A, B, C and D are arranged by time and are continuous in time. In one embodiment, the lost segment A contains one lost audio frame with a length of N. The segment B and segment C are firstly received and cached in a buffer (not shown). In one embodiment, a CRC (Cyclic Redundancy Check) is conducted over a link layer (not shown) of the Bluetooth communication protocol to indicate bad (including lost and error) audio frames and good frames, that is, each of the audio frames has an indication of a Frame ID (FID). Due to the time continuity, the segment B with a length of M is identified as a reference audio segment followed by the lost segment A, and the segment C with a length of L is identified as a cached audio segment followed by the reference audio segment B, and a segment D with a length of N is identified as a first good frame subsequent to the lost segment A. Please note the length of the segment C is larger than a total length of the segment B and A. In one embodiment, the length of the segment C is about 15 ms-30 ms. The length of the segment B is less than that of the segment A.

Figure 2:
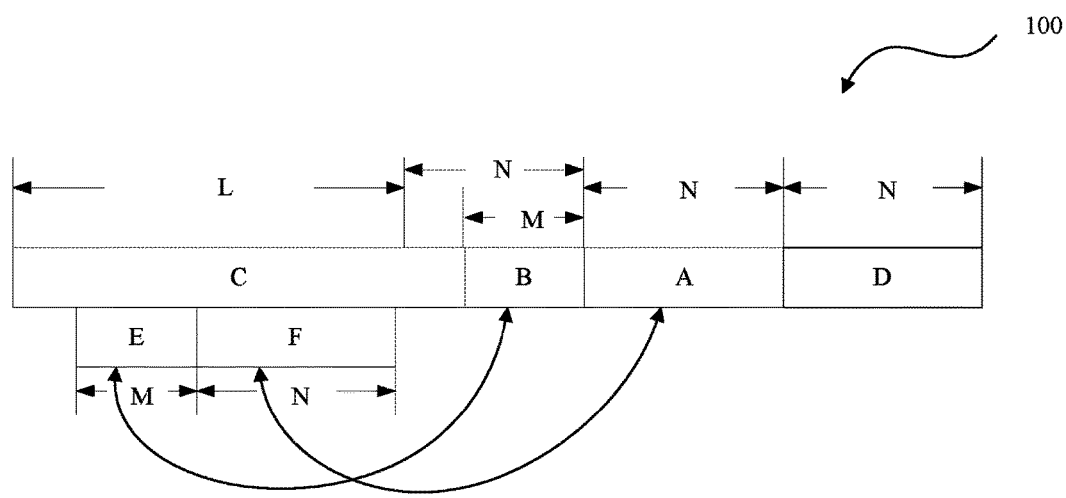
FIG. 2 is a diagram illustrating a cross-correlation search for the audio segments of FIG. 1 according to an embodiment of the invention.

FIG. 2 is a diagram illustrating a cross-correlation search for the audio segments 100 of FIG. 1 according to an embodiment of the invention. Due to the short-term correlation of audio segments, that is, the quasi-periodic property of the audio segments, a segment E with a length of M can be found by searching the segment C utilizing a cross-correlation search. The searched segment E is the most similar segment to the reference audio segment B, and a segment F followed by the segment E is identified as a pre-compensated audio segment to compensate for the lost segment A. The segment F has the same length as the lost audio frame.

The cross-correlation search includes calculating correlation coefficients in order to determine a start point of the segment E. The correlation coefficient R(k) is defined as:

$$R(k) = \frac{\sum_{0}^{M-1}[\vec{X_n} \cdot *\vec{Y_n(k)}]}{\sqrt{\sum_{0}^{M-1}\vec{X_n^2} \cdot \sum_{0}^{M-1}\vec{Y_n(k)}^2}}$$

where k=0 . . . L−M−1, and $X_n$ is the audio data of the segment B, and $Y_n$ is the audio data of the segment C.

The maximum correlation coefficient $R(k)_{max}$ is used to identify the most similar segment E to the segment B and the value of k is identified as the start point of the segment E.

Alternatively, when a correlation coefficient $R(k_1)_1$ is beyond a predetermined threshold, the cross-correlation search stops and the rest of the correlation coefficients will not be calculated. The value of $k_1$ is identified as the start point of the segment E.

Again referring back to FIG. 2, although the segment F is found as the pre-compensated audio segment to compensate for the lost segment A, the amplitude of the segment F is not matched with that of the lost segment A. Therefore, a scale factor (SF) of the amplitude may be calculated to revise the audio data of segment F. The scale factor can be defined as:

$$\text{Scale\_Factor} = \frac{\sum_{0}^{M-1}|\vec{X_n}|}{\sum_{0}^{M-1}|\vec{Y_n(K)}|}$$

where K is the start point of the segment E, and $X_n$ is the audio data of the segment B, and $Y_n$ is the audio data of the segment C.

The revised audio data of segment F is represented as Y'(n) and is defined as:

$$Y'(n) = SF*Y(n)$$

wherein n=0 . . . N−1, and Y(n) represents the original audio data of segment F, and N is the length of the lost audio frame. The revised segment F is copied to compensate for the lost audio segment A.

Figure 3:
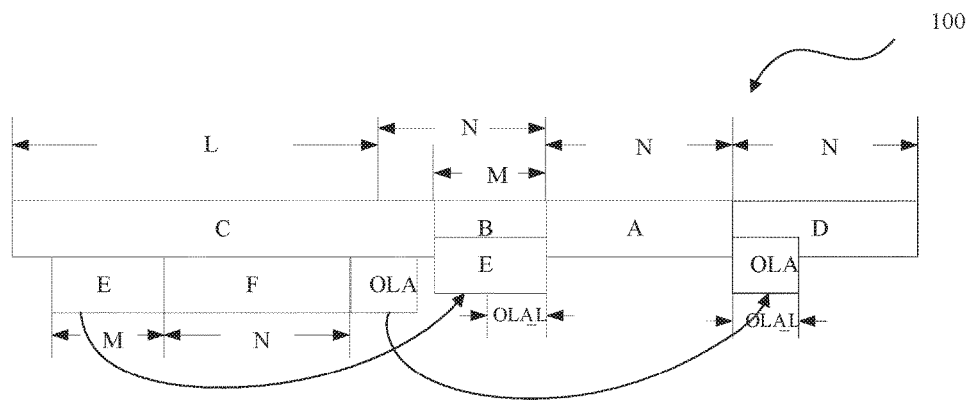
FIG. 3 is a diagram illustrating an overlap-adding operation for the audio segments of FIG. 1 according to an embodiment of the invention.

FIG. 3 is a diagram illustrating an overlap-adding operation for the audio segments 100 of FIG. 1 according to an embodiment of the invention. The overlap-adding operation is used to make phase continuous before and after the lost audio segment A so that a smooth transition of audio segments can be achieved and the audience will hear a smooth transition without popping or clicking noise.

Firstly, a window function is selected according to the actual requirement. The window function may be any one of Hamming Window, Blackman Window and Triangular Window. In one embodiment, the window function is a Triangular Window. The coefficient of the Triangular Window is defined as:

$$Wnd[OLA\_L] = \{15888, 15391, 14895, 14398, 13902,$$
$$13405, 12909, 12412, 11916, 11419, 10923, 10426, 9930,$$
$$9433, 8937, 8440, 7944, 7447, 6951, 6454, 5958, 5461,$$
$$4965, 4468, 3972, 3475, 2979, 2482, 1986, 1489, 993, 496\}$$

where Wnd[OLA_L] is a constant and OLA_L is the length of the Window.

Secondly, by using the given window function, as shown in FIG. 3, the reference audio segment B is overlap-added to the segment E to obtain a revised audio data S(i). That is, the audio data of the audio segment followed by the lost segment A with a length of OLA_L is replaced by audio data S(i) in order to make phase continuous before the lost segment A, and S(i) before the lost segment A is defined as:

$$S(i) = X_n(M-OLA\_L+i)*Wnd(i)+SF*Y_n(K+M-OLA\_L+i)*Wnd(OLA\_L-i-1)$$

where i=0 . . . OLA_L−1, and K is the start point of the segment E, and $X_n$ is the audio data of the segment B, and $Y_n$ is the audio data of the segment C, and SF is the scale factor.

Similarly, as shown in FIG. 3, in order to make phase continuous after the lost audio segment A, the first good frame D is overlap-added to an audio segment OLA with a length of OLA_L subsequent to the segment F by using the above window function. The data of the audio segment subsequent to the lost segment A with a length of OLA_L is replaced by the calculated audio data S(i), and S(i) after the lost segment A is defined as:

$$S(i) = Z_n(i)*Wnd(OLA\_L-i-1)+SF*Y_n(K+M+N+i)*Wnd(i)$$

where i=0 . . . OLA_L−1, and K is the start point of the segment E, and Z is the audio data of the segment D, and $Y_n$ is the audio data of the segment C, and SF is the scale factor.

Figure 4:
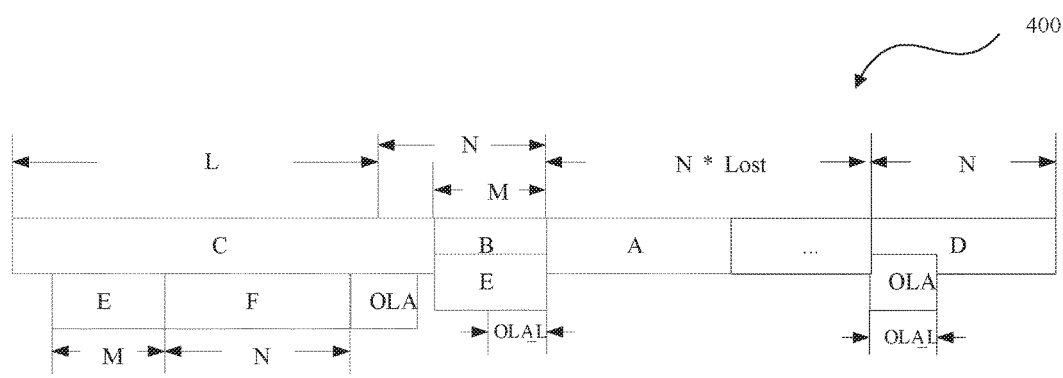
FIG. 4 is a diagram illustrating audio segments including two or more lost audio frames according to an embodiment of the invention.

FIG. 4 is a diagram illustrating audio segments 400 including two or more lost audio frames according to an embodiment of the invention. In the course of communication, it is inevitable to lose several audio frames continuously, which can be shown as N*lost in FIG. 4. However, since the same audio segment F is compensated for the lost audio frames repeatedly, a metallic sound is generated during the communication. In order to eliminate the metallic sound and further enhance sound quality, it may be desirable to utilize a ramping down/up operation to process the amplitude of the frame after a first lost audio frame A and a first good frame D. That is, if the current lost audio frame is the first lost audio frame A, the ramping down/up operation will not be initiated; if the current lost audio frame is a frame after the first lost audio frame A, ramping down the amplitude of the current lost audio frame and ramping up the amplitude of the first good frame D subsequent to the last lost audio frame; the amplitude of a frame will not be ramped down if the frame is located after the fifth lost audio frame to avoid absolute mute. In one embodiment, the amplitude weighting factor f(n) is defined as:

$$f(n) = -20\log\left(\frac{256 - \frac{2^N - 2}{2^{N-2}} \cdot n}{256}\right)$$

where N is the number of audio frames lost, i.e., N=2, 3, 4 or 5; if N>5, then N=5; n=0 . . . 63.

FIG. 5A-5E are diagrams illustrating the ramping down/up of the amplitude of the audio segments 400 including two or more lost audio frames according to an embodiment of the invention.

Figure 5A:
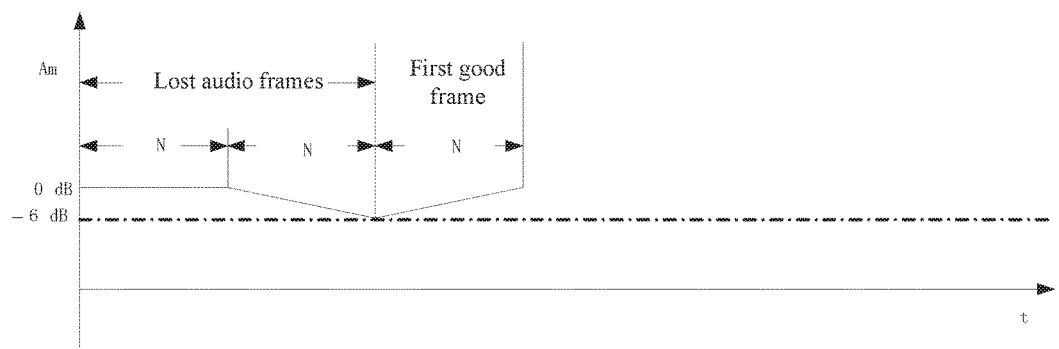
FIG. 5A-5E are diagrams illustrating ramping down/up of the amplitude of the audio segments 400 including two or more lost audio frames according to an embodiment of the invention.

As shown in FIG. 5A, for example, when there are two lost audio frames, the amplitude of the first lost audio frame remains unchanged and the amplitude of the second lost audio frame is linearly ramped down to −6 dB. The amplitude of the first good frame D subsequent to the second lost audio frame is linearly ramped up from −6 dB to 0 dB.

Figure 5B:
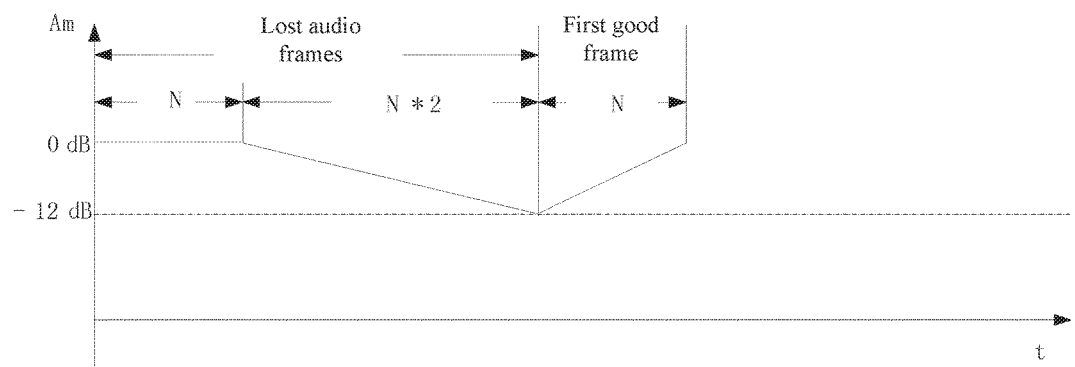

As shown in FIG. 5B, for example, when there are three lost audio frames, the amplitude of the first lost audio frame remains unchanged and the amplitudes of the second and third lost audio frames are linearly ramped down to −12 dB. The amplitude of the first good frame D subsequent to the third lost audio frame is linearly ramped up from −12 dB to 0 dB.

Figure 5C:
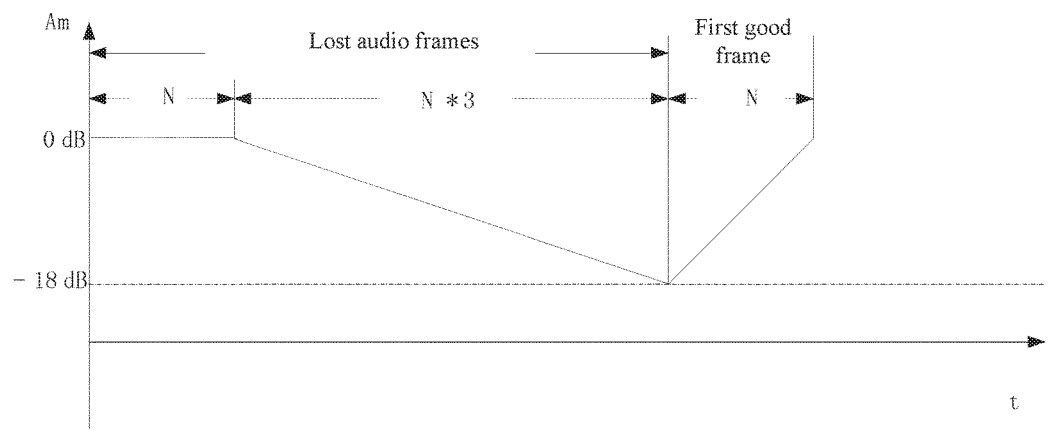

As shown in FIG. 5C, for example, when there are four lost audio frames, the amplitude of the first lost audio frame remains unchanged and the amplitudes of the second, third and fourth lost audio frames are linearly ramped down to −18 dB. The amplitude of the first good frame D subsequent to the fourth lost audio frame is linearly ramped up from −18 dB to 0 dB.

Figure 5D:
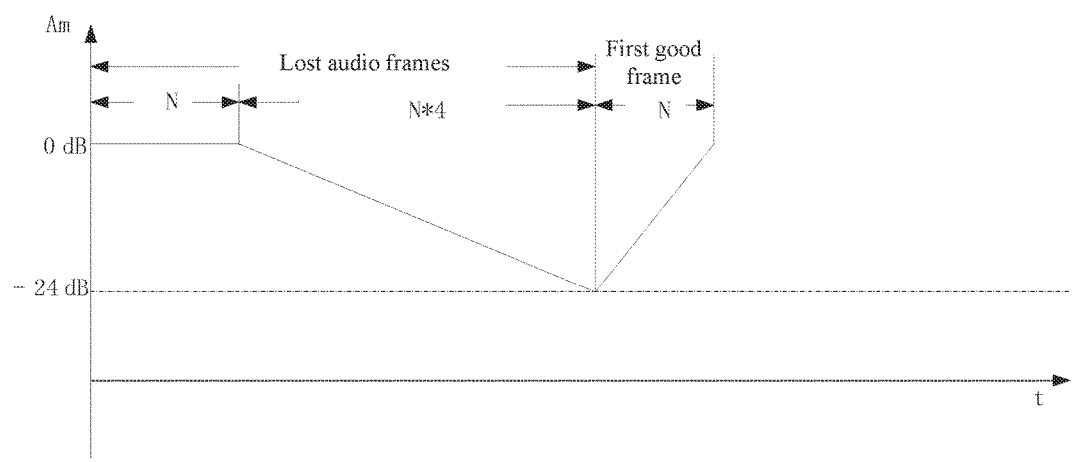

As shown in FIG. 5D, for example, when there are five lost audio frames, the amplitude of the first lost audio frame remains unchanged and the amplitudes of the second, third, fourth and fifth lost audio frames are linearly ramped down to −24 dB. The amplitude of the first good frame D subsequent to the fifth lost audio frame is linearly ramped up from −24 dB to 0 dB.

Figure 5E:
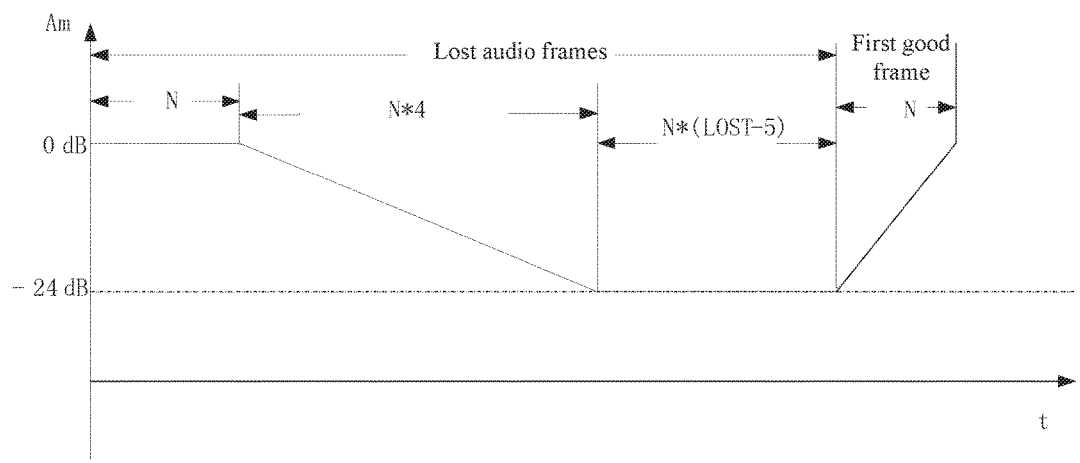

As shown in FIG. 5E, for example, when there are more than five lost audio frames, the amplitude of the first lost audio frame remains unchanged and the amplitudes of the second, third, fourth and fifth lost audio frames are linearly ramped down to −24 dB, and the amplitude of the frame after the fifth lost audio frame remains −24 dB to avoid absolute mute, and the amplitude of the first good frame D subsequent to the fifth lost audio frame is linearly ramped up from −24 dB to 0 dB.

Figure 6:
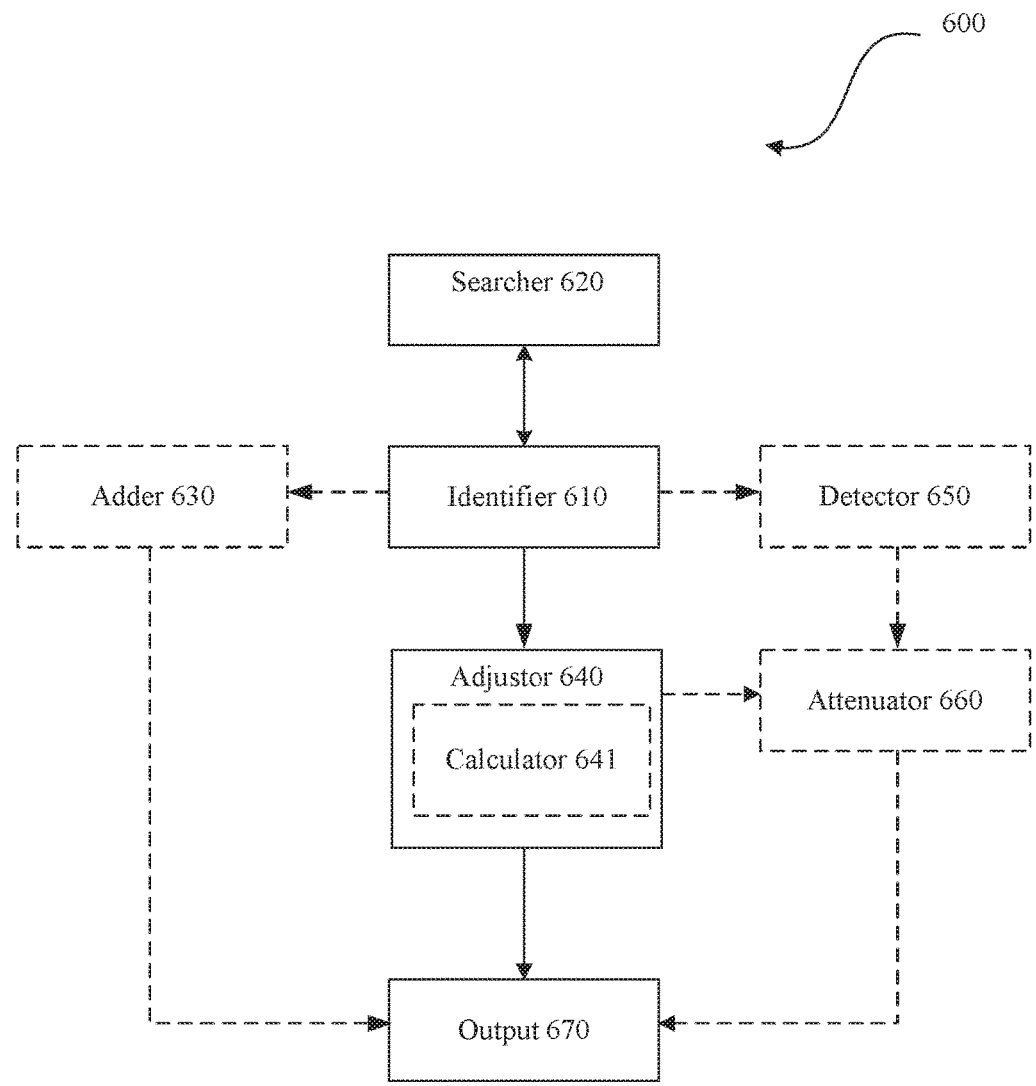
FIG. 6 is a diagram illustrating a circuit used for compensating for a lost audio frame according to an embodiment of the invention.

FIG. 6 is a diagram illustrating a circuit 600 used for compensating for a lost audio frame according to an embodiment of the invention. Please note the components indicated by dashed lines are not mandatory.

The circuit 600 comprises an identifier 610 configured to identify a reference audio segment with a first length followed by the lost audio frame with a second length; a searcher 620 coupled to the identifier 610 and configured to search for a first audio segment similar to the reference audio segment in a cached audio segment followed by the reference audio segment by utilizing a cross-correlation search, wherein the length of the cached audio segment is larger than a total length of the first length and the second length, and the first audio segment has the same length as the reference audio segment; the identifier 610 further configured to identify a second audio segment subsequent to the first audio segment as a pre-compensated audio frame, wherein the second audio segment has the same length as the lost audio frame; an adjustor 640 coupled to the identifier 610 and configured to adjust an amplitude of the second audio segment based on a scale factor; and an output 670 coupled to the adjustor 640 to output the adjusted second audio segment as a compensated audio frame.

Alternatively, the adjustor 640 further comprises a calculator 641 configured to calculate the scale factor according to the energy ratio of the reference audio segment to the first audio segment.

Alternatively, the circuit 600 further comprises an adder 630 coupled to the identifier 610 to overlap-add: i) the reference audio segment and the first audio segment by using a window function to make phase continuous before the lost audio frame; and ii) a first good frame subsequent to the lost audio frame and a third audio segment with a third length subsequent to the second audio segment by using the window function to make phase continuous after the lost audio frame, wherein the third length equals to the length of the window.

Alternatively, the circuit 600 further comprises a detector 650 coupled to the identifier 610 and configured to detect whether a current lost audio frame is a first lost audio frame A or a frame after the first lost audio frame A. The detector 650 receives instructions from a link layer (not shown) of the Bluetooth communication protocol to indicate a first lost audio frame. The circuit 600 further comprises an attenuator 660 coupled to the detector 650 and configured to linearly ramp down an amplitude of the current lost audio frame and linearly ramp up an amplitude of a first good frame subsequent to the last lost audio frame if the current lost audio frame is a frame after the first lost audio frame, and the attenuator 660 will not ramp down an amplitude of a frame if the frame is located after a fifth lost audio frame to avoid absolute mute.

Figure 7:
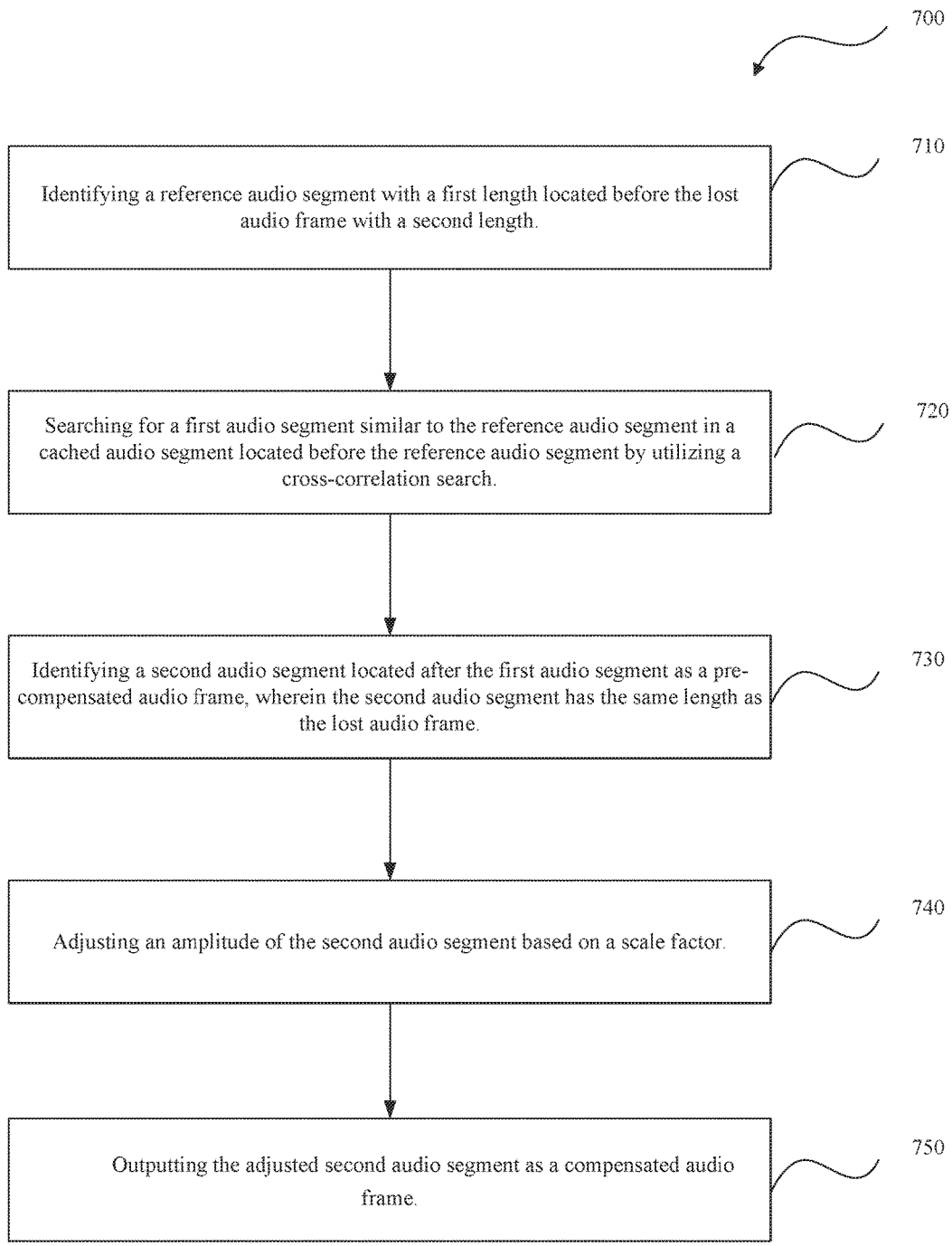
FIG. 7 is a flow chart of a method for compensating for a lost audio frame according to an embodiment of the invention.

FIG. 7 is a flow chart of a method 700 performed by the circuit 600 of FIG. 6 for compensating for a lost audio frame according to an embodiment of the invention.

The method 700 comprises in block 710, identifying a reference audio segment with a first length followed by the lost audio frame with a second length; in block 720, searching for a first audio segment similar to the reference audio segment in a cached audio segment followed by the reference audio segment by utilizing a cross-correlation search, wherein the length of the cached audio segment is larger than a total length of the first length and the second length, and the first audio segment has the same length as the reference audio segment; in block 730, identifying a second audio segment subsequent to the first audio segment as a pre-compensated audio frame, wherein the second audio segment has the same length as the lost audio frame; in block 740, adjusting an amplitude of the second audio segment based on a scale factor; and in block 750, outputting the adjusted second audio segment as a compensated audio frame.

Alternatively, the method 700 further comprises adjusting the amplitude of the second audio segment further comprises calculating the scale factor according to the energy ratio of the reference audio segment to the first audio segment.

Alternatively, the method 700 further overlap-adding: i) the reference audio segment and the first audio segment by using a window function to make phase continuous before the lost audio frame; and ii) a first good frame subsequent to the lost audio frame and a third audio segment with a third length subsequent to the second audio segment by using the window function to make phase continuous after the lost audio frame, wherein the third length equals to the length of the window.

Alternatively, the method 700 further comprises detecting whether a current lost audio frame is a first lost audio frame or a frame after the first lost audio frame, and if the current lost audio frame is a frame after the first lost audio frame, linearly ramping down an amplitude of the current lost audio frame and linearly ramping up an amplitude of a first good frame subsequent to a last lost audio frame. The amplitude of a frame will not be ramped down if the frame is located after a fifth lost audio frame to avoid absolute mute.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made without deviating from the spirit and scope of the present invention. Moreover, features of one embodiment may be incorporated into other embodiments, even where those features are not described together in a single embodiment within the present document. Accordingly, the invention is described by the appended claims.

We claim:

1. A circuit to compensate for a lost audio frame, comprising:
   an identifier configured to identify a reference audio segment with a first length followed by the lost audio frame with a second length;
   a searcher coupled to the identifier and configured to search for a first audio segment similar to the reference audio segment in a cached audio segment preceding the reference audio segment by utilizing a cross-correlation search, wherein a length of the cached audio segment is larger than a total length of the first length and the second length, and the first audio segment has a same length as the reference audio segment;
   the identifier further configured to identify a second audio segment subsequent to the first audio segment as a pre-compensated audio frame, wherein the second audio segment has a same length as the lost audio frame;
   an adjustor coupled to the identifier and configured to adjust an amplitude of the second audio segment based on a scale factor, wherein the adjustor further comprises a calculator configured to calculate the scale factor according to an energy ratio of the reference audio segment to the first audio segment; and
   an output coupled to the adjustor to output the adjusted second audio segment as a compensated audio frame.

2. The circuit of claim 1, wherein the circuit further comprises an adder coupled to the identifier to overlap-add:
   i) the reference audio segment and the first audio segment by using a window function to make phase continuous before the lost audio frame; and
   ii) a first good frame subsequent to the lost audio frame and a third audio segment with a third length subsequent to the second audio segment by using the window function to make phase continuous after the lost audio frame, wherein the third length equals to a length of the window.

3. The circuit of claim 1, wherein the circuit further comprises a detector coupled to the identifier and configured to detect whether a current lost audio frame is a first lost audio frame or a frame after the first lost audio frame.

4. The circuit of claim 3, wherein the circuit further comprises an attenuator coupled to the detector and configured to linearly ramp down an amplitude of the current lost audio frame and linearly ramp up an amplitude of a first good frame subsequent to the last lost audio frame if the current lost audio frame is a frame after the first lost audio frame, and the attenuator will not ramp down an amplitude of a frame located after a fifth lost audio frame to avoid absolute mute.

5. A method for compensating for a lost audio frame, comprising:
   identifying a reference audio segment with a first length followed by the lost audio frame with a second length;
   searching for a first audio segment similar to the reference audio segment in a cached audio segment preceding the reference audio segment by utilizing a cross-correlation search, wherein a length of the cached audio segment is larger than a total length of the first length and the second length, and the first audio segment has a same length as the reference audio segment;
   identifying a second audio segment subsequent to the first audio segment as a pre-compensated audio frame, wherein the second audio segment has a same length as the lost audio frame;
   adjusting an amplitude of the second audio segment based on a scale factor, wherein the scale factor is calculated according to an energy ratio of the reference audio segment to the first audio segment; and
   outputting the adjusted second audio segment as a compensated audio frame.

6. The method of claim 5, further comprising overlap-adding:
   i) the reference audio segment and the first audio segment by using a window function to make phase continuous before the lost audio frame; and
   ii) a first good frame subsequent to the lost audio frame and a third audio segment with a third length subsequent to the second audio segment by using the window function to make phase continuous after the lost audio frame, wherein the third length equals to a length of the window.

7. The method of claim 5, further comprising detecting whether a current lost audio frame is a first lost audio frame or a frame after the first lost audio frame, and if the current lost audio frame is the frame after the first lost audio frame, linearly ramping down an amplitude of the current lost audio frame and linearly ramping up an amplitude of a first good frame subsequent to a last lost audio frame.

8. The method of claim 7, further comprising an amplitude of a frame located after a fifth lost audio frame will not be ramped down to avoid absolute mute.

* * * * *